United States Patent [19]

Pesto

[11] 3,831,086

[45] Aug. 20, 1974

[54] APPARATUS FOR IDENTIFYING AND TRACING A PAIR OF CONDUCTORS

[75] Inventor: William Steve Pesto, Jamestown, N.C.

[73] Assignee: Bell Telephone Laboratories, Incorporated, Murray Hill, N.J.

[22] Filed: Nov. 28, 1973

[21] Appl. No.: 419,706

[52] U.S. Cl. .................................... 324/67, 324/52
[51] Int. Cl. ........................ G01r 19/00, G01r 31/02
[58] Field of Search ........................... 324/52, 66, 67

[56] References Cited

UNITED STATES PATENTS

| | | | |
|---|---|---|---|
| 1,084,910 | 1/1914 | Stephenson | 324/52 |
| 3,155,897 | 11/1964 | Rice | 324/52 |
| 3,344,348 | 9/1967 | McNair et al. | 324/66 |
| 3,418,572 | 12/1968 | Humphreys | 324/67 |
| 3,425,554 | 8/1947 | Nelson et al. | 324/52 |
| 3,670,240 | 6/1972 | Maranchak et al. | 324/52 |
| 3,711,767 | 1/1973 | Campbell et al. | 324/52 X |

*Primary Examiner*—Gerard R. Strecker
*Attorney, Agent, or Firm*—G. E. Murphy

[57] ABSTRACT

Apparatus for tracing electrically conductive elements particularly adapted to the tracing of twisted communications wire pairs is described. Both wire tracing and identification of an unknown terminus is provided by comparing the magnitude of the metallic and longitudinal signals induced into the wire pair by a portable transmitter unit which is moved along the path of the wire.

15 Claims, 5 Drawing Figures

APPARATUS FOR IDENTIFYING AND TRACING A PAIR OF CONDUCTORS

BACKGROUND OF THE INVENTION

1. Field of the Invention

This invention relates to the tracing of electrical conductors where the path of the conductors to be traced is not readily observable due to either surrounding structure or the conductors' disposition among many conductors of similar appearance. More particularly, this invention pertains to tracing balanced communication wire pairs such as those employed in a telephone system.

There are numerous instances in which electrical conductors are routed over substantial distances and, due to routing through structure which hides the conductors from view, or routing with a large number of conductors having a similar appearance, the route cannot be readily ascertained by visual tracing. One such situation is the main distribution frame of a telephone company central office.

The main distribution frame serves as an interconnection to connect customers' lines with the switching, transmission, signaling, and maintenance equipment necessitated by a modern telephone system. Typically, the customers' telephone lines, trunk and exchange lines, switching equipment, and all other apparatus necessary to provide a properly operating telephone system connect to terminal pairs on the main distribution frame. The necessary interconnections between these terminal pairs are provided by wire pairs or jumpers which are routed through wire runs or trays within the main distribution frame. In a typical installation, these jumpers may be several hundred feet long and may be imbedded deep within layers of jumpers that have accumulated over a long period of time.

Since it is necessary to change at least one jumper each time a new customer is added or a customer's service is changed, the main distribution frame is not only a congested area, often containing thousands of jumper pairs, but also the main distribution frame often becomes an area of intense activity. Consequently, disconnected jumpers are sometimes not removed, being left in place on the terminals or merely cut back to the main bundle within the main distribution frame tray. Moreover, proper records are not always maintained. All this, of course, results in unnecessary congestion of the main distribution frame. Accordingly, equipment is needed which will permit rapid wire tracing, both for the removal of unnecessary jumpers, which are commonly called "dead pairs," and for jumper tracing whenever records fail to reveal the actual terminus of a jumper.

It should be recognized that in situations such as wire tracing in the main distribution frame there are actually several separate operations necessary in order to determine which terminal pairs are connected to the wires being traced. If the operator begins at a known wire terminus, these operations are: rapidly following the basic course of the wires through the structure of the main distribution frame; determining that a locality has been reached where the wires are connected to a pair of terminals; and determining which ones of the terminals are actually connected to the wires being traced. Moreover, the most versatile of wire tracing apparatus should allow the operator to begin the tracing operation at points other than a known wire terminus. That is, if it is believed that the sought-for wires pass through a certain location, the tracing apparatus should permit a rapid and reliable verification, thereby allowing the operator to begin the wire tracing operation at that point.

2. Description of the Prior Art

Numerous wire tracing apparatus have been used to determine the path of concealed electrically conductive structure, including pipes, conduits, and wires. One type of such apparatus comprises an alternating current signal source which is connected directly to a known terminus of the conductive structure to be traced and a sensitive portable receiver with means for indicating the received signal strength. In operation, the conductive structure radiates the ac signal along its entire length and the receiver is moved about to monitor the signal strength. In essence, the operator homes in on a locality through which the conductor passes, and by moving in a manner which exhibits maximum received signal strength the complete course of the conductive structure can be traced.

Although such apparatus allows a single operator to trace the path of most conductive members, two basic limitations are encountered in the application of this type of apparatus to the tracing of communication wire pairs. First, the apparatus is capable only of determining the basic path followed by the conductor and includes no provision for distinguishing the conductor being traced from other similar appearing conductors. In the example of the telephone main distribution frame, this means that the level of tracing normally attained presents the test set operator with the problem of a large number of terminal pairs, any one of which could be connected to the traced wire pair. The second limitation is the relatively high electromagnetic field which must be established in order to provide sufficient field strength for suitable receiving units. A prior art wire tracer which uses sufficiently large transmitted signals may induce an undesirable interference signal in other communication pairs carrying voice or data information. On the other hand, attempts to reduce the radiated signal by utilizing receivers of sufficient sensitivity have been constrained by the electromagnetic interference typically present in environments such as the telephone company central office.

U.S. Pat. No. 3,155,897, issued to R. B. Rice on Nov. 3, 1964, discloses a wire tracing technique which is inherently capable of operating at signal levels which greatly reduce the danger of interference. This apparatus utilizes a hand-held transmitter which is moved along the conductor being traced and a stationary receiver unit which is connected to a known terminus of a conductor. Although basically this merely reverses the role of the transmitter and receiver, the electromagnetic field required to induce a signal into the conductor has been found to be much less than that required in the previously described system. It has been determined that this configuration could operate successfully with signals induced into the pair at a level 30 db below that of commercially available wire tracers which physically connect the signal source to the wire pair. This signal reduction results primarily from the elimination of the inefficient receiving antenna which is required to maintain portability in the first described system. The apparatus described by Rice, however, is basically a cable fault locator and although capable of operation as a basic wire tracer, does not provide unique identification of a wire pair which is disposed among many like-appearing pairs. Nor does it provide information regarding the location of the terminals which connect to the traced wires.

It is therefore an object of this invention to provide wire tracing apparatus which operates at signal levels which minimize the probability of electrical interference with other proximate communication pairs.

It is a further object of this invention to provide tracing apparatus capable of tracing any conductive structure, but novelly suited for tracing the twisted wire pairs of a balanced communication system such as in a telephone main distribution frame.

It is a still further object of this invention to provide wire tracing apparatus wherein not only the path of the wire pair can be determined, but the particular wire pair and those terminals connected to it may be readily ascertained.

SUMMARY OF THE INVENTION

These and other objects are achieved, in accordance with this invention, by detecting and comparing components of the signal induced in a wire pair by a handheld transmitter unit. More particularly, in wire tracing apparatus of the type employing a receiver connected at known terminus and a transmitter for electromagnetically inducing a signal into the wire pair, the signal induced between one or both of the wire pair conductors and ground and the signal induced between the two conductors of the wire pair are detected by the receiver and subsequently compared. Circuit apparatus for amplifying, filtering, and comparing these two signals is provided. The circuit characteristics are established such that a first output signal is produced when the signal between the wire pair and ground dominates, thereby indicating that the signal is induced at a point along the twisted path of the wire pair, and a second output signal is produced when the signal between the conductors of the wire pair dominates, indicating that the signal is induced at a terminal pair where the wires are untwisted. The first output signal also indicates the proximity relationship between the transmitter unit and the wire pair.

In situations where a multiplicity of terminals are located in close proximity, the second output signal may not indicate the exact terminal pair, but will localize the termination to a small number of terminals. To provide further isolation of the terminals to that pair sought and also to provide verification that the wire pair located is, in fact, the one sought, the wire tracing apparatus may also provide for a low frequency continuity or verification test. Thus, the present invention provides rapid location of the exact terminus of the wire pair while safeguarding against interference with other in-service pairs.

DETAILED DESCRIPTION

Figure 1:
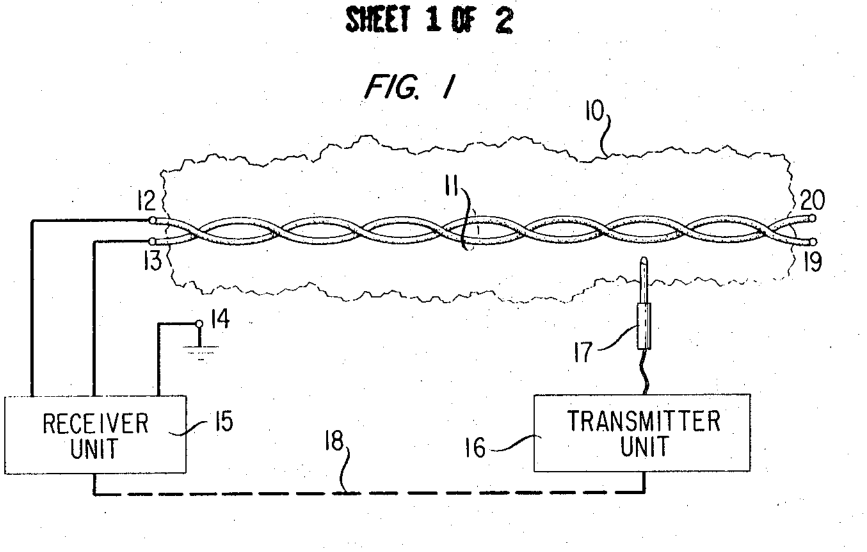
FIG. 1 is a block diagram of wire tracing apparatus constructed in accordance with this invention.

FIG. 1 depicts the basic wire tracing apparatus of this invention and the manner of its connection to a main distribution frame. Wire pair 11 exemplifies a wire pair whose path through the main distribution frame is to be traced. Typically, wire pair 11 is disposed among many similar pairs in the main distribution frame tray, which is indicated by broken line 10. A known terminus of pair 11, terminals 12 and 13, and the main distribution frame ground terminal 14 are connected to receiver unit 15. Portable transmitter unit 16 generates a tracing signal, preferably in the frequency range of 20 to 30 kHz, which is coupled to pair 11 by means of an antenna or probe 17. It will be recognized that when probe 17 is held near any portion of wire pair 11 that is twisted, the signal induced in each wire of the wire pair will be substantially equal in magnitude and of the same phase. Thus, the signal appearing between terminals 12 and 13, commonly called the metallic signal, will be much smaller than that signal, commonly called the longitudinal signal, appearing between terminals 12 or 13 and the main distribution frame ground terminal 14. It will be further recognized that if wire pair 11 is a perfectly balanced pair wherein the impedance between terminal 12 and the main distribution frame ground 14 is identical to the impedance between terminal 13 and the main distribution ground 14, essentially no metallic signal will be induced and the magnitude of the longitudinal signal would be determined solely by the electromagnetic field radiated by probe 17 and the distance between probe 17 and wire pair 11.

Figure 2:
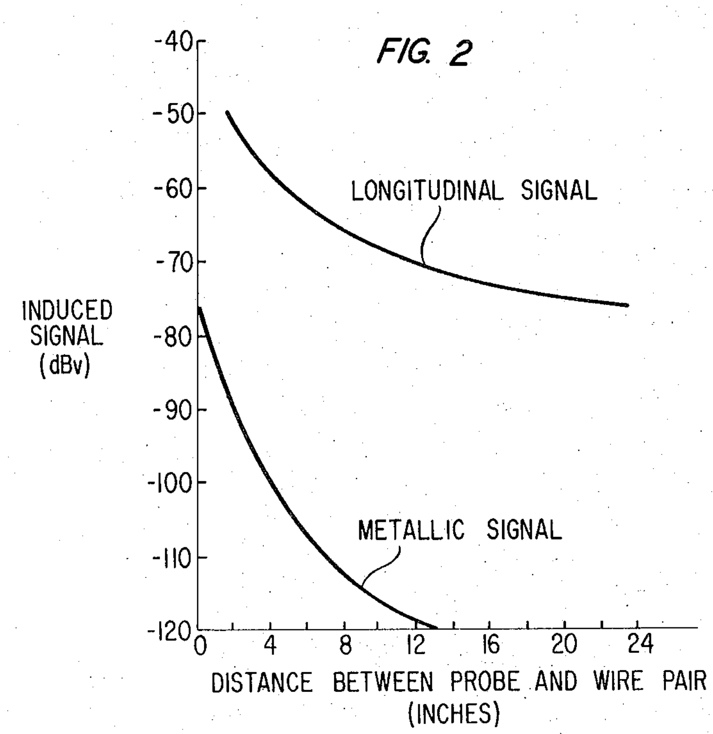
FIG. 2 illustrates typical induced longitudinal and metallic voltages as the wire tracer transmitter probe is brought nearer a terminus of the traced wire pair.

When probe 17 is held near a terminus of wire pair 11 or any other portion of the length in which the wires are not twisted but lie substantially parallel, a sizeable metallic signal is induced. FIG. 2 demonstrates that, although both the metallic and longitudinal signals increase as the probe is brought into close proximity with an untwisted wire pair, the metallic signal increases much more rapidly than the longitudinal signal. Thus, it will be recognized that by providing more gain in processing the metallic signal than is utilized in processing the longitudinal signals, the signals which represent the metallic and longitudinal voltages can be set equal when probe 17 is a predetermined distance from an untwisted wire pair. Receiver unit 15 will ordinarily provide for the amplification of both the metallic and longitudinal signals. In one embodiment of this apparatus, it has been found advantageous to utilize 22 db more gain in processing the metallic signal than is used in processing the longitudinal signal. But regardless of the gain employed, FIG. 2 readily demonstrates that it is possible to select a distance from the untwisted portion of wire pair 11 at which the wire tracing apparatus will indicate that an untwisted portion or a terminus of wire pair 11 has been located.

Signals indicative of the metallic voltage and the longitudinal voltage, whether amplified or not, are coupled from receiver 15 to transmitter 16 via data link 18, which is preferably a conventional rf transmission system. Transmitting unit 16 typically contains circuitry necessary to convert the signal received from data link 18 into an indication which is perceivable to the wire tracer operator. It has been found advantageous to provide an indication which indicates the relative distance between probe 17 and wire pair 11 whenever the longitudinal signal dominates and also to provide a separate indication whenever the metallic signal dominates. It has been found especially advantageous to utilize an audible tone which changes frequency in response to the changing proximity between probe 17 and wire pair 11 and to modulate or periodically interrupt this tone when the metallic signal indicates that the wire pair is no longer twisted but has separated to connect to a terminal pair. The use of audible tones is advantageous since it does not require the apparatus operator to constantly observe a visual indication. Moreover, a variable frequency tone is especially advantageous because the human sensitivity to frequency variation or pitch surpasses the sensitivity to other audio characteristics. It should be recognized that the provision of the variable frequency tone during the portion of the wire tracing operation in which the wire pair is twisted allows the wire tracer operator to maintain probe 17 in close proximity with traced pair 11, or alternately, to probe about the main distribution frame wire runs to locate the traced wire when its complete path from the known terminus has not been followed.

Figure 3:
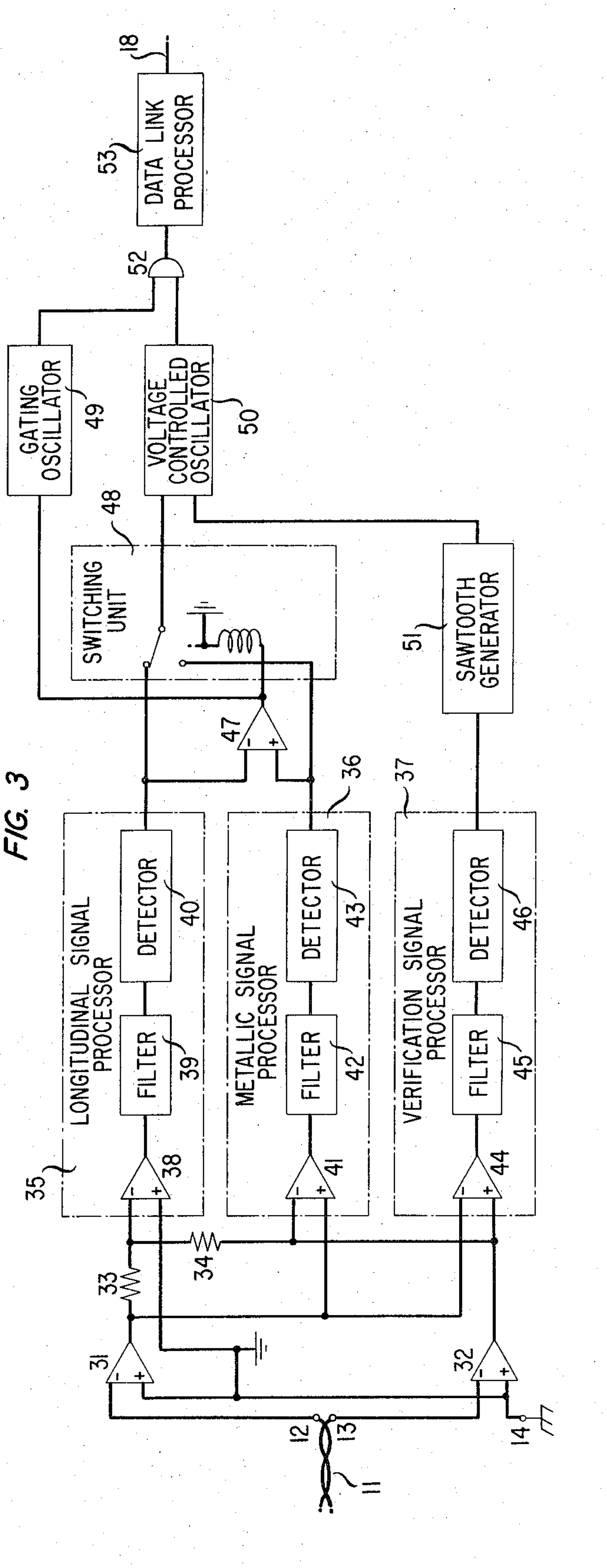
FIG. 3 depicts a block diagram of a receiver unit which has proven satisfactory in the practice of this invention.

FIG. 3 depicts a block diagram of a receiver unit which provides for the practice of this invention. It should be understood that FIG. 3 merely illustrates one means of practicing the invention and that any signal processing circuit which produces an indication of the relative magnitude of the metallic and longitudinal signals will suffice. The particular technique utilized in the receiver embodiment in FIG. 3, however, has been found to be especially amenable to construction utilizing standard integrated circuitry such as operational amplifiers. Insofar as possible, each element of FIG. 3 which corresponds to an element of FIG. 1 has been denoted by the same identifying number. As illustrated, input terminals 12, 13, and 14 connect to the two wires of wire pair 11 and the main distribution frame ground, respectively. It should be recalled that the metallic signal is that signal appearing between terminals 12 and 13, whereas the longitudinal signal for each conductor of the pair appears between terminals 12 and 14 and between terminals 13 and 14, respectively. In a well-balanced system the two longitudinal signals would be essentially equal and either signal would be suitable for the practice of this invention. Amplifiers 31 and 32 connect between terminals 12 and 14 and terminals 13 and 14, respectively. Both amplifiers 31 and 32 are essentially isolation amplifiers which may provide impedance matching, some frequency shaping, and gain. The output of amplifiers 31 and 32 is directed to the input of three separate processors 35, 36, and 37. Processor 35 develops a signal representative of the longitudinal signal, processor 36 develops a signal representative of the metallic signal, and processor 37 develops a signal representative of the low frequency metallic verification signal which is injected directly onto the wire pair during the verification procedure.

In longitudinal signal processor 35, the outputs of amplifiers 31 and 32 are connected to amplifier 38, via summing resistors 33 and 34, respectively. Amplifier 38 provides gain and preferably frequency discrimination to aid in attenuating signals not at the wire tracing frequency. Filter 39 is a conventional bandpass filter tuned to the frequency of the wire tracing transmitter and provides further rejection of noise signals. Detector 40 responds to the peak signal appearing at the output of filter 39. Thus, the output of detector 40 represents the value of the wire pair longitudinal signal or, more particularly, the sum of the two longitudinal signals associated with the wire pair.

In processor 36, amplifier 41 is a differential amplifier, one input being connected to the output of amplifier 31 while the second input is connected to the output of amplifier 32. Amplifier 41 provides gain and preferably some rejection of signals not at the wire tracing frequency. The output of amplifier 41, representative of the difference between the signals applied to terminals 12 and 13, and thereby representative of the wire pair metallic signal, is supplied to filter 42, which may be identical to filter 39. The output of filter 42 is connected to detector 43, which may be identical to detector 40. The outputs of detector 40 and detector 43 are both connected to the input terminals of voltage comparator 47, as well as to the input to switching unit 48. Voltage comparator 47 provides an enabling signal to switching unit 48 and to gating oscillator 49 whenever the metallic signal, as represented by the output of detector 43, exceeds the longitudinal signal output of detector 40.

In the absence of the enabling signal, indicating that the longitudinal signal dominates, switching unit 48 directs the output of detector 40 to voltage controlled oscillator 50. Voltage controlled oscillator 50 may be any oscillator which produces an audio frequency signal, the frequency of which is proportional to the magnitude of an applied signal. Thus, as the signal output of detector 40 increases in response to an increase in the wire pair longitudinal signal, the output frequency of voltage controlled oscillator 50 changes.

When the output of detector 43 exceeds that of detector 40, the enabling signal produced by comparator 47 causes switching unit 48 to direct the output of detector 43 to the input of voltage controlled oscillator 50. In addition, the enabling signal is connected to gating oscillator 49. Gating oscillator 49 may be any gated oscillator which produces a low frequency signal whenever a gating or enabling signal is present. In this case, the output frequency of voltage controlled oscillator 50 is thus controlled by the magnitude of the wire pair metallic signal. Both the output of the voltage controlled oscillator 50 and gating oscillator 49 are connected to gate circuit 52. In the presence of the enabling signal output of comparator 47, the low frequency output signal of gating oscillator 49 serves as an inhibiting input to gating circuit 52. Thus, the output of gating circuit 52 is a periodically interrupted signal of varying frequency whenever the enabling signal of comparator 47 is present, indicating an input signal which is predominately metallic in nature and is an uninterrupted signal of varying frequency whenever the signal is predominately longitudinal in nature, as indicated by the absence of the enabling signal output of comparator 47. In all cases, the output of gating circuit 52 is connected to data link processor 53. Data link processor 53 adapts the signal output of gating circuit 52 to a suitable format for transmission to the wire tracer operator via data link 18. For example, if the data link utilizes conventional amplitude modulated rf transmission, data link processor 53 would include an rf generator, a modulator, and an antenna.

Processor 37 is similar to processor 36 in that it is responsive to a metallic signal and includes differential amplifier 44, filter 45, and detector 46. The frequency characteristic of processor 37, however, is established so that the processor is responsive only to a low frequency verification signal which is injected directly onto the wire pair in order to pinpoint which pair of a group of terminals located by the basic wire tracing apparatus discussed above is connected to the wire pair, or, alternately, in order to verify that a single pair of terminals located by the above process is connected to the wire pair. Detector 46 differs from detectors 40 and 43 in that detector 46 is a threshold detector which applies a trigger signal to a triggered sawtooth generator 51 whenever the verification signal exceeds a predetermined level. The establishment of a threshold below which there will be essentially no output from detector 46 solves a special problem in tracing jumpers within the main distribution frame and can be eliminated in some applications by replacing detector 46 with a peak detector which may be identical to detectors 40 and 43. In main distribution frame wire tracing, the established threshold ensures that a verification indication is not produced if the wire pair is interrupted by a repeating coil or by a coupling network.

The presence of an output signal from detector 46 energizes sawtooth generator 51 which supplies a low frequency periodic ramp signal to voltage controlled oscillator 50. Energizing voltage controlled oscillator 50 with the sawtooth signal generates a frequency modulated output signal which, when detected and audibly reproduced as an indication of terminal verification, produces a distinctive siren-like or warbling sound. The output of voltage controlled oscillator 50 is routed to data link processor 53 via gate 52 and hence transmitted over data link 18 to the test set operator.

Figure 4:
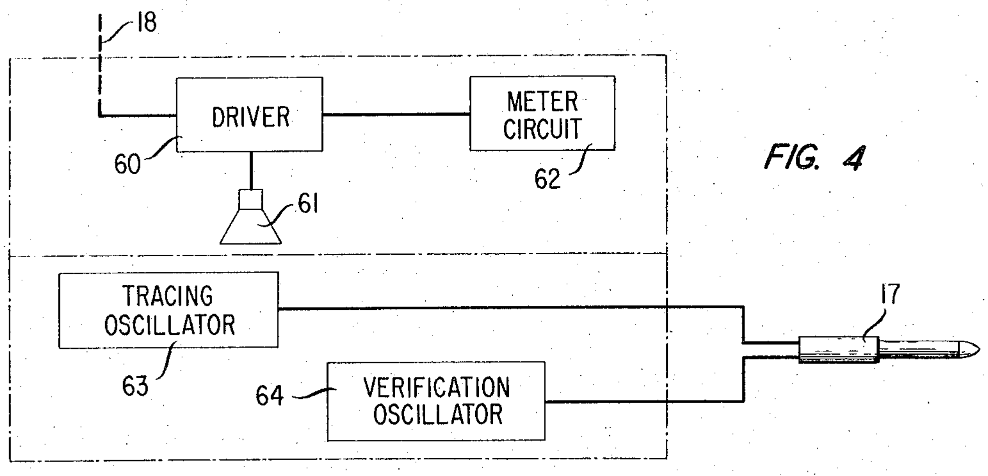
FIG. 4 depicts a block diagram of a transmitter unit which has proven satisfactory in the practice of this invention.

As depicted in FIG. 4, the transmitter unit serves a dual purpose, converting the information received via data link 18 into an indication perceivable to the wire tracer operator and also generating the wire tracing signal and verification signals. Signals arriving from the wire tracer receiver via data link 18 are coupled to driver 60 where the signals which indicate a verification signal, a dominant metallic signal, or a dominant longitudinal signal are conventionally detected and amplified. Driver 60 provides a signal to transducer 61, which is a conventional loudspeaker or earphone, and also may provide a signal to meter circuit 62. Meter circuit 62 is an optional circuit to provide a meter indication of the magnitude of the signal from the wire tracer receiver. This meter indication may be utilized in applications where it is desirable to compare the field strength at different points along the traced path.

Tracing oscillator 63 may be any conventional audio frequency oscillator which generates a signal at the desired tracing frequency. This signal is applied to probe 17 to establish the electromagnetic field utilized in the wire tracing operation. Verification oscillator 64 is a conventional low frequency signal source, the output of which is also connected to probe 17. In the case of the verification signal, however, the signal is not radiated as an electromagnetic field, but is connected directly to a pair of contacts which are held in physical contact with the tested terminals during the verification procedure.

Figure 5:
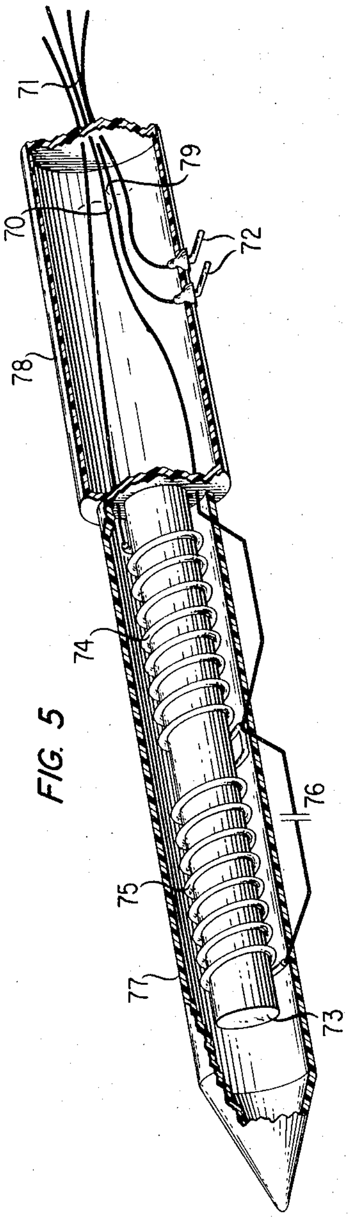
FIG. 5 is a partially pictorial, partially schematic representation of a probe which has provided a satisfactory electromagnetic field in the practice of this invention.

One embodiment of probe 17 which has been utilized in the practice of the invention is depicted in FIG. 5. The wire tracing signal generated by tracing oscillator 63 is connected to winding 74 via wire pair 70 of cord assembly 71. Winding 74 couples the tracing signal into winding 75 which, with capacitor 76, forms a parallel tuned circuit which resonates at the wire tracing frequency. Rod 73, of magnetic material such as ferrite, provides a form for winding 74 and winding 75 while simultaneously enhancing the electrical characteristics. Housing 77, of a material which will not interfere with the radiated field, forms a protective covering and also is shaped to allow easy insertion into the wire bundles during the tracing operation. Handle 78 allows the operator to easily grasp the probe throughout the tracing operation.

The output of verification oscillator 64 is connected to verification terminal pair 72 via wire pair 79 of cord assembly 71. Verification terminal pair 72 is arranged so that the terminals may be held in direct contact with the main distribution frame terminals during the verification procedure.

While one advantageous embodiment to illustrate the invention is shown, it will be understood by those skilled in the art that various changes and modifications can be made therein without departing from the scope of the invention as defined in the appended claims. For example, portions of the signal processing apparatus described as being contained within receiver unit 15 may alternately be located within transmitter unit 16. Or the longitudinal signal between a single conductor of the wire pair and the main distribution frame ground may be utilized rather than the sum of the two longitudinal signals, as described above.

What is claimed is:

1. Apparatus for tracing a pair of wires comprising:

generating means, movable along the path of said pair of wires for electromagnetically inducing a tracing signal into said pair of wires;

receiver means, connected to a known terminus of said pair of wires, including means for detecting a first signal between the two conductors of said pair of wires, and including means for detecting a second signal between at least one conductor of said pair of wires and a terminal of fixed potential; and means responsive to said first and second signals for developing an indication of the proximity between said wire pair and said generating means.

2. The wire tracing apparatus of claim 1 wherein said means for detecting said first signal includes means for determining the difference between the signals induced in each wire of said wire pair.

3. The wire tracing apparatus of claim 1 wherein said means for detecting said second signal includes means for determining the sum of the signals induced in each wire of said wire pair.

4. The apparatus of claim 1 wherein said means for producing an indication comprises:

means for generating a first indication signal when the difference between said second signal and said first signal exceeds a predetermined value, and means for generating a second indication signal when said difference between said second signal and said first signal does not exceed said predetermined value.

5. The wire tracing apparatus of claim 4 wherein said first indication signal is representative of the amplitude of said second signal.

6. The wire tracing apparatus of claim 5 wherein said first and second indication signals are distinct audible signals, the frequency of said first audible signal determined by the amplitude of said second signal.

7. Wire tracing apparatus of the type including generating means for electromagnetically inducing a tracing signal between a pair of wires being traced and a terminal of fixed potential, said generating means movable along the path of said wires being traced; and receiving means connected to a known terminus of said wires including first detecting means for detecting said signal induced between at least one conductor of said wires being traced and said terminal of fixed potential, wherein the improvement comprises:

second detecting means connected to said known terminus for detecting a signal induced between the two conductors of said wire pair; and indicating means, responsive to said first and second detecting means for developing an indication of the amplitude relationship between said signal between said wire pair and said terminal of fixed potential and said signal between said two conductors of said wire pair.

8. The wire tracing apparatus of claim 7 wherein the improvement further comprises summing means within said first detecting means, said summing means being responsive to the signals induced in each of said two conductors.

9. The wire tracing apparatus of claim 8 wherein said second detecting means includes difference means responsive to the signals induced in each of said conductors.

10. The wire tracing apparatus of claim 9 wherein said indication means includes means for developing a first indication when the difference between the sum of said signals induced in said two conductors and said difference signal between said two conductors of said wire pair exceeds a predetermined value, and means for developing a second indication when said difference does not exceed said predetermined value.

11. The wire tracing apparatus of claim 10 wherein said indication means includes means for developing said first and said second indication signals as first and second audible signals.

12. The wire tracing apparatus of claim 11 wherein the frequency of said second indication signal is controlled by the amplitude of said signal between said wire pair and said terminal of fixed potential.

13. The method of tracing the path of a wire pair having at least one known terminus comprising the steps of:

electromagnetically inducing an electrical signal into said wire pair;

detecting a first induced signal at said known terminus between the two conductors of said wire pair;

detecting a second induced signal at said known terminus between at least one of said conductors of said wire pair and a terminal of fixed potential; and comparing said first and second induced signals to determine the path of said wire pair and vicinities along said path wherein said wire pair is connected to terminal apparatus.

14. The method of claim 13 wherein the amplitude of said second induced signal provides an indication of the proximity between said means for electromagnetically inducing a signal and said wire pair.

15. The method of locating localities along the path of a generally twisted wire pair wherein the two conductors of the wire pair are not twisted together, but lie substantially parallel, comprising the steps of:

electromagnetically inducing an electrical signal into said wire pair at a preselected point along the path of said wire pair;

detecting the induced metallic signal at a known terminus of said wire pair;

detecting the induced longitudinal signal at said known terminus; and comparing said detected metallic and longitudinal signals to determine if said conductors are twisted at said preselected point of electromagnetic induction.

* * * * *